United States Patent Office 2,714,613
Patented Aug. 2, 1955

2,714,613

DI-(p-SUBSTITUTED PHENYL)-THIOUREAS

Charles F. Huebner, Chatham, N. J., and Caesar R. Scholz, Basel, Switzerland, assignors to Ciba Pharmaceutical Products, Inc., Summit, N. J., a corporation of New Jersey No Drawing. Application October 8, 1953, Serial No. 385,030

7 Claims. (Cl. 260—552)

The present invention relates to 1,3-diphenyl-thioureas and the salts thereof, wherein one phenyl nucleus is substituted in the p-position with a di(lower alkyl)aminoethoxy radical and the other phenyl group is substituted in the p-position with a lower aliphatic hydrocarbon ether radical, wherein the lower aliphatic hydrocarbon radical contains from 3 to 5 carbon atoms.

Despite intensive research for a long time by scientists for chemotherapeutic agents effective against tuberculosis, the results achieved have left much to be desired. A primary object of the present invention is the provision of a group of new substances characterized by anti-tuberculosis activity in high degree with concomitant low toxicity. These substances are adapted to be administered orally or if desired may be administered by parenteral injection.

The di-(p-substituted phenyl)-thioureas of the present invention correspond to the general formula

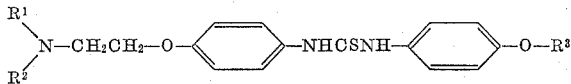

wherein $R^1$ and $R^2$ are lower alkyl and $R^3$ is a lower aliphatic hydrocarbon radical containing from 3 to 5 atoms. The salts are readily water soluble and solutions thereof can be administered parenterally.

The new compounds are obtained by reacting an appropriately p-substituted aniline with an appropriately p-substituted isothiocyanate. The isothiocyanate bearing reactant may bear either the p-lower aliphatic ether radical or the p-(lower dialkyl)aminoethoxy radical. The reaction may be carried out with or without the employment of a solvent, such as alcohol, benzene, toluene, propanol and the like. The reaction is carried out as desired either at room temperature or at elevated temperature, although as a general rule, application of external heat is unnecessary. Depending on mode of procedure, the new thioureas are obtained either in the form of the free bases or acid addition salts. The latter may be treated with alkalis, e. g., ammonia, or alkali metal hydroxides, to obtain the free bases. When the bases are treated with acids, the corresponding salts are readily formed.

The p-substituted anilines may be made by reacting an alkali metal salt of p-acetamino phenol with an alkyl halide or a di-(lower alkyl)aminoethyl halide. Reaction of the alkyl halide may be carried out in aqueous ethanol. The reaction of the di(lower alkyl)aminoethyl halide is carried out in acetone or an inert solvent, such as toluene. The di(lower alkyl)aminoethyl halide may be generated in situ by an excess of alkali acting on the di(lower alkyl)-aminoethyl halide hydrochloride. The di(lower alkyl)-aminoethoxy substituent may be introduced also by the following procedure: p-acetamino phenol is alkylated in the usual manner with an ethylene di-halide or an ethylene halohydrin. The di(lower alkyl)amino group is introduced by reaction of the halide bearing ether with the appropriate di(lower alkyl)amine. When employing ethylene halohydrin to prepare the ether, the hydroxyl must first be replaced by halide by treatment with a phosphorous halides or thionyl halide before subsequent processing steps are carried out. The ether of p-acetamino phenol thus produced is then hydrolized in acid solution to remove the acetyl group to yield the desired p-substituted aniline.

Alternatively, an alkali metal salt of p-nitrophenol may be alkylated in the same way as described above and converted to the corresponding analine derivative by reduction.

The required isothiocyanates are prepared from the p-substituted aniline by reaction with thiophosgene (see Dyson, Journal of the Chemical Society, London (1927), p. 436); or by the decomposition of the dithiocarbamate lead salt.

The new compounds are useful as therapeutics or intermediates for the preparation of therapeutically active substances. The new compounds, as aforesaid, possess anti-tuberculosis activity and in this connection the thioureas, wherein one phenyl nucleus is substituted in p-position with a di(lower alkyl)aminoethoxy radical and the other in p-position with an n-butoxy or isobutoxy group, are outstanding for their antitubercular activity.

The invention is described in greater detail in the following examples which are presented by way of illustration. In the said examples parts by weight bear the same relation to parts by volume as do grams to milliliters. Temperatures are expressed in degrees centigrade. Melting points are uncorrected.

Example 1

330 parts by weight of p-acetamino phenol and 306 parts by weight of powdered anhydrous potassium carbonate are stirred under reflux with 2,250 parts by volume of acetone. 300 parts by weight of diethylaminoethyl chloride is added over 1½ hours. Stirring and refluxing are continued for 19 hours. The solid inorganic salts are removed by filtration and the acetone removed by distillation. The syrupy residue is refluxed for 5 hours with a mixture of 1,722 parts by volume of water, 635 parts by volume of concentrated hydrochloric acid, and 217 parts by volume of ethanol. The clear solution is made alkaline with 50% aqueous sodium hydroxide, the oil separating is extracted with ether, the ether extract dried over solid potassium hydroxide and distilled to yield p-diethylamino-ethoxy aniline boiling at 180–182° at 12 millimeters pressure.

To a mixture of 20 parts by volume of thiophosgene and 200 parts by volume of water is added with stirring 43.0 parts by weight of p-isobutoxy-aniline and 170 parts by volume of chloroform while maintaining the temperature at 10–15°. After ½ hour, the chloroform layer is removed, dried over sodium sulfate and distilled to yield p-isobutoxy-phenyl isothiocyanate boiling at 172–176° at 15 millimeters. p-n-Butoxy-phenyl isothiocyanate B. P. at 15 mm. 179–181° was obtained in the same way by reacting thiophosgene with n-butoxy aniline.

A solution of 207 parts by weight of p-isobutoxy-phenyl isothiocyanate in 560 parts by volume of 95% ethanol is added to a solution of 208 parts by weight of p-diethyl-aminoethoxy aniline in 560 parts by volume of 95% ethanol. The mixture is allowed to stand at room temperature for 12 hours and then treated with 136 parts by volume of 7.9 N hydrogen chloride in ethanol (1 molar equivalent) with cooling. On the addition of ether or ethyl acetate pure crystalline 1-(p-diethylaminoethoxyphenyl)-3-(p-isobutoxyphenyl)-2-thiourea hydrochloride separates; M. P. 164–166°. It may be recrystallized, if desired, from ethanol-ethyl acetate or chloroform-petroleum ether.

Alternatively the hydrochloric acid may be added to the alcoholic solution of p-diethylaminoethoxy aniline before reaction with the isothiocyanate.

The free base, 1(-p-diethylaminoethoxyphenyl)-3-(p-isobutoxyphenyl)-2-thiourea, may be prepared by basifying an aqueous solution of the hydrochloride salt with ammonia. After recrystallization from chloroform, it melts at 82–86°.

By substituting p-n-butoxyphenyl isothiocyanate for the p-isobutoxyphenyl isothiocyanate in the above example there is obtained 1-(p-diethylaminoethoxy phenyl)-3-(p-n-butoxyphenyl)-2-thiourea hydrochloride, M. P. 153–156°. The free base can be obtained by treating the hydrochloride with ammonia.

*Example 2*

A mixture of 120 parts by weight of p-acetamino phenol-($\beta$-bromoethyl ether) and 209 parts by volume of a 40% solution (weight by volume) of dimethylamine in ethanol is heated in an autoclave 8 hours at 100°. The solvent is removed by distillation and the residue taken into solution using the minimum volume of water. Addition of sodium hydroxide causes p-acetaminophenol-($\beta$-dimethylaminoethyl ether) to separate, which is hydrolyzed with a mixture of 1,666 parts by volume of concentrated hydrochloric acid in 844 parts by volume of water for 2 hours. The resulting solution is made basic with sodium hydroxide and the oil separating distilled to yield pure p-dimethylaminoethoxy aniline boiling at 168–9° at 15 millimeters pressure.

8 parts by weight of p-dimethylaminoethoxy aniline is reacted as described in Example 1 with 8.7 parts by weight of p-isobutoxyphenyl isothiocyanate to yield 1-(p-dimethylamino ethoxyphenyl)-3-(p-isobutoxyphenyl)-2-thiourea hydrochloride; M. P. 190–192°. The substance may be crystallized from absolute ethanol if desired.

Reaction of p-dimethylaminoethoxy aniline with p-n-butoxyphenyl isothiocyanate in the same manner yields 1-(p-dimethylaminoethoxyphenyl) - 3 - (p-n-butoxyphenyl)-2-thiourea; M. P. 142–144°, which may be recrystallized from ethanol-water.

p-Dimethylaminoethoxy aniline can also be prepared by the following alternative procedures:

A. To a stirred suspension of 4.8 parts by weight of powdered sodium hydroxide in 200 parts by volume of toluene is added 30.2 parts by weight of p-acetamino phenol. After refluxing and stirring for 30 minutes, 30 parts by weight of dimethylaminoethyl chloride and 50 parts by volume of toluene is added over 30 minutes. The mixture is refluxed for 7 hours, cooled, washed with water and 5% aqueous sodium hydroxide and the toluene distilled off. The residue is hydrolyzed with 2 N hydrochloric acid as described above to yield p-dimethylaminoethoxy aniline.

B. To a stirred refluxing mixture of 20 parts by weight of dry powdered sodium p-nitrophenolate in 200 parts by volume of xylene is added over 30 minutes, 20 parts by weight of dimethylaminoethyl chloride. Refluxing is continued for 10 hours. The solid inorganic salts are filtered off and the xylene distilled off. The oily p-dimethylaminoethoxy nitrobenzene is dissolved in ethanol and hydrogenated over Raney nickel catalyst at 40 lbs. per square inch. After removal of the catalyst, the ethanol solution of p-dimethylaminoethoxy aniline is reacted directly with the desired isothiocyanate. p-Dimethylaminoethoxy nitrobenzene may be characterized by its crystalline hydrochloride; M. P. 199–201°.

*Example 3*

A mixture of 200 parts by weight of p-allyloxyphenyl isothiocyanate (prepared from 1 molar equivalent of p-allyloxy-aniline and 1.3 molar equivalents of thiophosgene by the same procedure as described in Example 1) and 189 parts by weight of p-($\beta$-dimethylaminoethoxy) aniline and 2,000 parts by volume of ethanol is stirred for a few minutes when complete solution occurs. After standing at room temperature for several hours crystallization of 1-(p-allyloxyphenyl)-3-($\beta$-dimethylaminoethoxyphenyl)-2-thiourea begins and is brought to completion by the addition of water. The purified thiourea produced by recrystallization from ethanol melts at 149–150°.

*Example 4*

A mixture of 10 parts by weight of p-propoxyphenyl isothiocyanate (prepared from 1 molar equivalent of p-propoxy-aniline and 1.3 molar equivalents of thiophosgene by the same procedure as described in Example 1), 93 parts by weight of p-($\beta$-dimethylaminoethoxy) aniline and 1,000 parts by volume of ethanol are reacted as described in Example 1. Pure 1-($\beta$-dimethylaminoethoxyphenyl)-3-(p-propoxyphenyl)-2-thiourea is obtained after recrystallization from ethanol-water; M. P. 139–140°.

*Example 5*

A mixture of 245 parts by weight of p-n-amyloxyphenyl isothiocyanate (prepared from 1 molar equivalent of p-n-amyloxy-aniline and 1.3 molar equivalents of thiophosgene by the same procedure as described in Example 1) and 200 parts by weight of p-($\beta$-dimethylaminoethoxy) aniline and 1,000 parts by volume of ethanol is allowed to react as described in Example 1. The free base of the reaction product does not crystallize easily from the mixture. The hydrochloride salt is obtained by adding 1 molar equivalent of 8 N ethanolic hydrogen chloride whereupon the hydrochloride of 1-(p-n-amyloxyphenyl)-3-(p-dimethylaminoethoxyphenyl)-2-thiourea is obtained which after recrystallization from 95% ethanol melts at 166–167°.

*Example 6*

A mixture of 245 parts by weight of p-isoamyloxy phenyl isothiocyanate (prepared from 1 molar equivalent of p-isoamyloxy-aniline and 1.3 molar equivalents of thiophosgene by the same procedure as described in Example 1) and 200 parts by weight of p-($\beta$-dimethylaminoethoxy) aniline in 1,000 parts by volume of ethanol is allowed to react as described in Example 1. 1 Molar equivalent of 8 N ethanolic hydrogen chloride is added, followed by addition of ethyl acetate which causes crystallization of the hydrochloride of 1-($\beta$-dimethylaminoethoxyphenyl)-3-(p-isoamyloxyphenyl) - 2 - thiourea which after recrystallization from 90% ethanol-ethyl acetate melts at 183–184°.

In addition to the hydrochloric acid salts other non-toxic or therapeutically useful salts of the thioureas can be prepared by treating the free bases with appropriate acids, for example, hydrobromic, hydriodic, sulfuric, nitric, perchloric, phosphoric, formic, acetic, propionic, lactic, oxalic, succinic, malic, tartaric, citric, ascorbic, methyl sulfonic, hydroxyethyl sulfonic, benzoic, salicylic, p-amino-salicylic, toluene sulfonic, and the like acids.

We claim:

1. A member of the group consisting of a di-(p-substituted phenyl)-thiourea wherein the substituent in one of the phenyls is a di(lower alkyl)aminoethoxy radical and the substituent in the other phenyl is a butoxy radical, and non-toxic acid addition salts thereof.

2. A salt of the compound of claim 1.

3. 1 - ( p - diethylaminoethoxyphenyl)-3-(p-isobutoxyphenyl)-2-thiourea.

4. The hydrochloride of the compound of claim 3.

5. 1-(p-diethylaminoethoxyphenyl) - 3 - (p - n - butoxyphenyl)-2-thioureau.

6. The hydrochloride of the compound of claim 5.

7. The hydrochloride of 1-(p-dimethylaminoethoxyphenyl)-3-(p-isobutoxyphenyl)-2-thiourea.

References Cited in the file of this patent

UNITED STATES PATENTS 2,050,557    Bockmuhl et al. _____ Aug. 11, 1936